April 2, 1963 W. A. PITTS 3,083,571
POSITIVE VOLUME FLUID METER
Filed May 24, 1956 2 Sheets-Sheet 1

INVENTOR.
William. A. Pitts,
BY
ATTORNEY.

April 2, 1963  W. A. PITTS  3,083,571
POSITIVE VOLUME FLUID METER
Filed May 24, 1956  2 Sheets-Sheet 2

INVENTOR.
William A. Pitts,
BY John D. Schneider
ATTORNEY.

United States Patent Office 3,083,571
Patented Apr. 2, 1963

3,083,571
POSITIVE VOLUME FLUID METER
William A. Pitts, Bellaire, Tex., assignor, by mesne assignments, to Jersey Production Research Company, Tulsa, Okla., a corporation of Delaware
Filed May 24, 1956, Ser. No. 586,964
11 Claims. (Cl. 73—224)

This invention is directed to a positive volume liquid meter for tanks and vessels wherein complete filling and emptying measures a consistent volume of liquid entrapped in each cycle. More specifically, the invention is directed to a metering device wherein a liquid level sensing means is positioned above a 100 percent full closure means of a vessel thereby providing consistent volume measurements in each cycle of filling and emptying.

The invention is also directed to means and method of operation whereby the cyclic operation of the meter is performed automatically.

In methods and apparatuses heretofore used for measuring the quantity of oil produced and delivered to a transporting pipe line, the liquid depth in large storage tanks is measured when the tanks are full and then again when substantially empty. Then, the quantity is computed or determined from tables. The liquid depths are normally measured manually with steel gauge tapes and are consequently subject to errors. It is necessary to provide large storage capacity to collect the oil production and hold it until periodic gauging and delivery to the transporting pipe line whose facilities are also necessarily of large capacity because of the periodic-type deliveries made to them. The necessity for hand gauging to measure production to insure accuracy is one of the major obstacles preventing fully automatic and continuous processing of oil production.

While positive displacement meters have heretofore been available on the market, numerous disadvantages are inherent in their use. For example, they employ intricate moving parts which are subject to rapid wear and constant change in accuracy. Moreover, accuracy is frequently dependent upon the rate of flow and upon other factors that introduce inaccuracies.

The present invention avoids such disadvantages. Moreover, it is readily adaptable to automation. Its accuracy is independent of rate of flow. There are no moving parts which when worn affect its accuracy of measurement. Further, it is readily adaptable for use with volumetric compensators for temperature changes, pressure changes or other factors such as the percent or proportion of foreign liquids or other matter in the liquid being measured. Also, it is readily adaptable to incorporation of liquid sampling devices. Moreover, it is equally suitable for use in pressure systems or in atmospheric and gravity systems. It is advantageous for, in addition to its use in the measuring of liquids, it may be used in automatically proportioning and dividing the measured output, particularly under uneven or intermittent flow conditions.

The principle of operation of this device makes the use thereof independent of the size of the vessel and hence can be applied to many of the present storage tanks with only small additions being necessary in most instances, or it can be built into a small volume tank such as a tank having a capacity of one barrel.

Briefly, the invention comprises a first tank provided with a controlled liquid inlet and outlet means arranged thereon. A second tank or reservoir or suitable pipe is positioned on top of the first tank and positioned between these two tanks is a valve means adapted to selectively permit and prevent liquid flow therebetween. Starting with the first tank empty, liquid is introduced into the first tank through the liquid inlet until the first tank has become full and the liquid then rises through the valve means positioned between the two tanks into the second tank, after which further introduction of liquid into the first tank through the liquid inlet means is discontinued.

The second tank functions to provide means for determining the liquid level therein; it also functions to permit expansion or contraction of the liquid in the first tank through the valve means. The fixed volume below the valve means is the calibrated volumetric content of the vessel.

The valve means determines the upper cut-off point which fixes the calibrated volumetric content of the lower tank. By flooding the valve means, that is, by having the fluid rise above the valve means into the second tank a full measure of fluid in the first tank is assured even if volumetric changes of the fluid occur. The second tank has sufficient capacity to accommodate such volumetric changes.

The valve means remains open until it is desired to deliver the measured quantity of liquid at which time the valve means is closed and liquid is then withdrawn from the first tank through the outlet means until the first tank is empty or until it has reached a predetermined lower level in the tank. The first tank is then again ready for refilling and in order to insure that the quantity of liquid removed from the first tank during each emptying cycle is always the same, the liquid outlet from the first tank is fully closed no later than the time that the valve means between the first and second tanks is opened and no later than the time that liquids are introduced into the first tank through the liquid inlet. The filling cycle is then repeated in order to accomplish a cyclic metering operation.

The invention contemplates either manual operation, partially automatic operation, or fully automatic operation. If manual operation only is desired, means may be provided for giving a visual indication of the presence of fluid in the second tank or pipe; a sight glass may be used for this purpose. In order to accomplish at least partially automatic operation, a control means is provided in the second tank so as to be operatively responsive to the liquid level in the second tank, the control means being arranged to close the valve positioned between the first and second tank and to stop further introduction of fluid into the first tank through the liquid inlet means when the fluid has reached a preselected level in the second tank. If fully automatic operation is desired, a second control means is provided in addition to the first control means mentioned above, this second control means being operatively responsive to the liquid discharge from the first tank. In this instance, the first and second control means co-operate to control the flow of fluid to and from the first tank through the liquid inlet and outlet means and to control the flow of fluid between the first and second tanks through the valve means positioned therebetween. A pilot control system may be used to control the sequence of steps referred to above. This pilot control system may suitably be a pneumatic system, an electric system, a hydraulic system, or a mechanical system, or combinations thereof. A pneumatic system is hereinafter described.

It is to be noted that numerous types of liquid meters heretofore known employ the principle of a liquid level control to actuate filling and emptying tank valves. However, the difference between known meters and the present invention lies in the mode of obtaining the measurement. Known meters depend upon float or control actuation at exactly the same liquid levels at both full and empty conditions, regardless of the rate of metering. The accuracy of these types of meters depends upon the quick and uniform response of the floats, pilot and control valves in the system and to a degree upon the pressure of the control media. The accuracy of the measurement of the meter described herein is independent of the critical movement of snap-acting valves, counterweights or the effect of specific gravity of the liquid on the triggering point of the float mechanisms. The following description of the nature and operation of the invention is clearly illustrated in the drawings to which reference will now be made.

Figure 1:
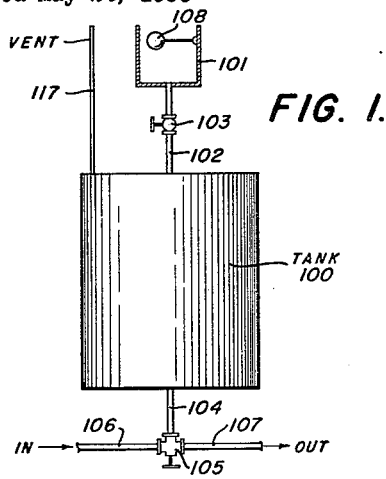
FIG. 1 is a diagrammatic view of the metering device of the present invention.

The arrows in the figures designate the direction of fluid flow. Referring to the figures in greater detail wherein identical numerals designate identical parts, FIG. 1 shows a tank 100 with a reservoir 101 mounted thereabove. Fluidly connecting tank 100 and reservoir 101 is a conduit 102 in which is mounted a valve 103 adapted to be moved to a fully closed first position and also to a fully open second position. A conduit 104 fluidly communicates with the bottom of tank 100 and mounted in conduit 104 is a 3-way valve 105. An inlet conduit 106 fluidly communicates with valve 105 and an outlet conduit 107 also fluidly communicates with valve 105. Valve 105 is so constructed that it will permit liquid to flow into tank 100 through conduit 106 and conduit 104 when moved to one position, which position prevents fluid communication to conduit 107, and to permit liquid to flow from tank 100 through conduits 104 and 107 when moved to another position, which position prevents fluid communication to conduit 106. Obviously the valve 105 may be replaced by separate valves positioned in conduits 106 and 107 to accomplish the same purpose.

Because it is important to accurate metering that the valves be operated in the right sequence and at the right times, the sequence of valve operation during filling and before emptying of tank 100 will first be described and then the sequence of valve operation during emptying and before filling will be described, thus describing a full metering cycle.

During the entire time that tank 100 is being filled, 3-way valve 105 must be so positioned that liquid can flow into tank 100 through conduit 106 but cannot flow from tank 100 through conduit 107; during the entire time that tank 100 is being filled, valve 103 is open. After tank 100 has been completely filled with liquid and sensing element 108 shows that liquid has appeared in reservoir 101, further delivery of liquid to tank 100 is discontinued and tank 100 is readied for emptying. Further delivery of liquid to tank 100 is discontinued by manipulating valve 105 so that no further amounts of liquid can flow to tank 100 through conduits 106 and 104. Before any liquid is withdrawn from tank 100 through conduit 107, valve 103 must be completely closed. The purpose of thusly positioning valves 105 and 103 at this time is to prevent liquid from entering tank 100 from any source after the withdrawal of liquid from tank 100 is commenced through conduits 104 and 107. It is possible, of course, that valve 103 may be closed and valve 105 may be moved to the position fluidly communicating conduit 104 with conduit 107 simultaneously although it must be understood that the only requirement is that the immediately preceding condition must be fulfilled. Accordingly, simultaneous operation of these two valves is not required although such operation may be convenient.

Assuming that tank 100 has been emptied through conduits 104 and 107, the filling portion of the cycle is ready to be commenced. Before any liquid is permitted to enter tank 100 after tank 100 has been emptied, valve 105 must be positioned so that fluid communication between conduits 104 and 107 cannot take place. This means that valve 105 must be moved so as to completely discontinue communication between conduits 104 and 107 before or precisely at the same time that valve 103 is opened by even the slightest amount. After valve 105 has been moved to such a position, valve 103 is opened thus allowing the liquid previously trapped in reservoir 101 to flow into tank 100. Valve 105 is then moved to such a position as to permit liquid to flow into tank 100 through conduits 106 and 104. Valve 105 may be moved to this last-mentioned position at the same time that valve 103 is opened, if desired. Of course, after valve 103 has been opened, sensing element 108 indicates that reservoir 101 no longer contains liquid. At this time the system has been returned to the filling portion of the cycle so that the cycle described above may be repeated.

Figure 2:
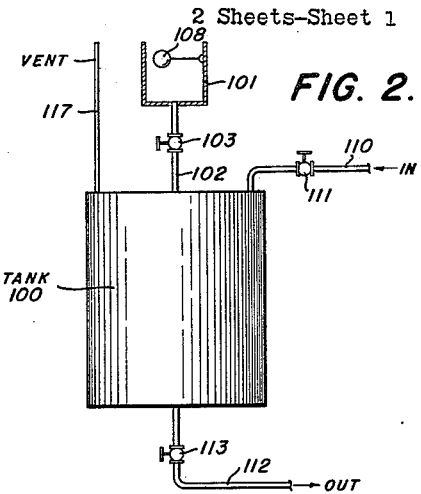
FIG. 2 is a diagrammatic view of one embodiment of the metering device of this invention.

FIG. 2 shows a tank 100 with a reservoir 101 mounted thereabove. Tank 100 and reservoir 101 are fluidly connected by means of a conduit 102 in which is mounted a valve 103 adapted to be moved to a fully closed first position and to a fully open second position. An inlet line 110 fluidly connects with tank 100 and the flow of liquid therethrough into tank 100 is controlled by valve 111; valve 111 is adapted to be moved to a fully closed first position and to a fully open second position. A conduit 112 fluidly connects with tank 100 adjacent the bottom thereof, a valve 113 being positioned in conduit 112. Valve 113 is adapted to be moved to a fully closed first position and to a fully open second position so as to prevent and to permit liquid flow through conduit 112.

During the entire time that tank 100 is being filled, valve 113 must be fully closed so that no liquid can flow to or from tank 100 through conduit 112; during filling, valves 103 and 111 are open. After tank 100 has been completely filled with liquid and sensing element 108 shows that liquid has appeared in reservoir 101, further delivery of liquid to tank 100 is discontinued and tank 100 is readied for emptying. Further delivery of liquid to tank 100 is discontinued by completely closing valve 111. Before any liquid is withdrawn from tank 100 through conduit 112, valve 103 must be completely closed. It is to be understood, of course, that valves 111 and 103 may be closed simultaneously although this is not necessary. What is necessary is that valves 111 and 103 be completely closed before any liquid is withdrawn from tank 100 through conduit 112. This means that valves 111 and 103 must be completely closed before or precisely at the same time valve 113 is opened even the slightest amount.

During the entire time that tank 100 is being emptied through conduit 112, no liquid can be allowed to enter tank 100 through conduit 102 or conduit 110. Therefore, during this period, both valve 103 and valve 111 must be maintained completely closed. Before any liquid is permitted to enter tank 100 after tank 100 has been emptied through conduit 112, valve 113 must be completely closed. This means that valve 113 must be completely closed before or at precisely the same time as valves 103 and 111 are opened even the slightest amount. Of course, when valve 103 is opened the liquid previously trapped in reservoir 101 flows through conduit 102 into tank 100 and sensing element 108 indicates the absence of liquid in reservoir 101. It is not necessary, of course, at this stage that valves 103 and 111 be opened simultaneously although there is no objection to opening these two valves simultaneously.

Figure 3:
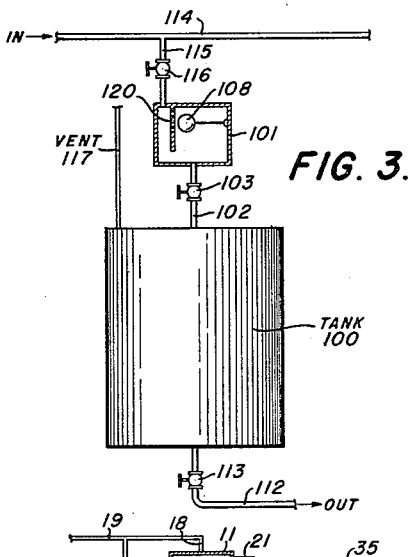
FIG. 3 is a diagrammatic view of another embodiment of the metering device of this invention.

FIG. 3 shows a tank 100 having a reservoir 101 mounted thereabove. A conduit 102 fluidly connects tank 100 with reservoir 101. Valve 103 is positioned in conduit 102 for controlling the flow of fluid therethrough. Valve 103 is adapted to be moved to a fully closed first position preventing liquid from flowing through conduit 102 and is adapted to be moved to a fully open second position to permit liquid to flow through conduit 102. Conduit 112 connects with the bottom of tank 100 and a valve 113 is positioned in conduit 112. Valve 113 controls the flow of fluid from tank 100; it is adapted to be moved to a closed position for preventing the flow of fluid to or from tank 100 through conduit 112 and is adapted to be moved to an open position permitting liquid to flow from tank 100 through conduit 112. In contrast to the open-topped reservoir shown in FIGS. 1 and 2, the reservoir 101 of FIG. 3 is shown as having a closed top. Reservoir 101 is fluidly connected to a flow line 114, through which the liquid to be measured may be flowed continuously from one vessel to another vessel, not shown, by means of a conduit 115 in which is positioned a valve 116. Valve 116 is adapted to prevent flow of fluid from flow line 114 through conduit 115 to reservoir 101 when moved to its closed position and is adapted to permit flow of fluid from flow line 114 through conduit 115 to reservoir 101 when moved to its open position. A suitable perforated baffle 120 may be provided in reservoir 101 to prevent the incoming liquid from directly impinging upon sensing element 108 and, thereby, giving a false indication that tank 100 has been filled.

During the entire time that tank 100 is being filled, valve 113 must be fully closed so that no liquid can flow to or from tank 100 through conduit 112; during filling, both valve 103 and valve 116 are open. After tank 100 has been completely filled with liquid and sensing element 108 shows that a pool of liquid has formed in reservoir 101, further delivery of liquid to tank 100 is discontinued and tank 100 is readied for emptying. Further delivery of liquid to tank 100 is discontinued by closing valve 103. If the right-hand branch of flow line 114 empties into a vessel, valve 116 need not be closed inasmuch as excess liquid will flow through said right-hand branch to said vessel when reservoir 101 is completely filled and, therefore, incapable of receiving further liquid. On the other hand, if the right-hand branch is not provided with a vessel into which it may empty or if the right-hand branch is closed off so that in effect it does not serve as part of the system described, valve 116 is preferably closed. If the right-hand branch is connected with another metering vessel similar to the one shown working alternately with the one shown to afford continuous metered flow, then valve 116 would have to be closed in order to keep the two vessels operating in the proper phase relation. In any event, before any liquid is withdrawn from tank 100 through conduit 112, valve 103 must be completely closed. It is satisfactory, of course, if valve 103 is closed at precisely the same time that valve 113 is opened.

During the entire time that tank 100 is being emptied, no liquid can be allowed to enter tank 100 through conduit 102. Therefore, valve 103 must be maintained completely closed during the entire time that tank 100 is being emptied through conduit 112. Moreover, before any liquid is permitted to enter tank 100 after tank 100 has been emptied through conduit 112, valve 113 must be completely closed. This means that valve 113 must be completely closed before or precisely at the same time as valve 103 is opened even the slightest amount. With valve 113 and valve 103 in the last-mentioned positions, the system has again been returned to the filling portion of the cycle. The opening of valve 103, of course, permits the liquid previously trapped in reservoir 101, assuming that valve 116 was previously closed, to flow into tank 100. Of course, if valve 116 had previously been closed, it is now necessary to open valve 116 so that tank 100 may be filled. If, on the other hand, valve 116 had not previously been closed, liquid will flow from flow line 114 through conduit 115 into reservoir 101 and through conduit 102 into tank 100 to again fill the tank. The valves are now properly positioned to repeat the metering cycle heretofore described.

Figure 4:
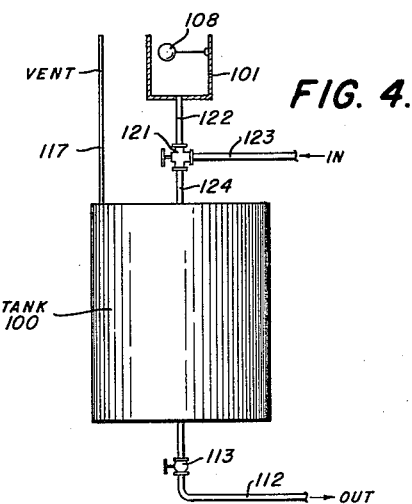
FIG. 4 is a diagrammatic view of another embodiment of the metering device of this invention.

FIG. 4 shows a tank 100 with a reservoir 101 mounted thereabove. Conduits 122 and 124 fluidly interconnect reservoir 101 and tank 100. A valve 121 is positioned between conduits 122 and 124 and an inlet conduit 123 fluidly communicates with valve 121. An outlet conduit 112 fluidly communicates with the bottom of tank 100 and a valve 113 is positioned in conduit 112. A fluid sensing element 108 is positioned in reservoir 101. Valve 121 fluidly communicates inlet conduit 123, conduit 122 and conduit 124 when in a first position and completely closes off fluid communication between conduits 122, 123 and 124 when in a second position.

In operation assuming that tank 100 has been emptied through conduit 112, before any liquid is admitted to tank 100 through conduits 123 and 124, valve 113 is closed. Then, valve 121 is manipulated to fluidly communicate conduits 123, 124 and 122. When tank 100 has been completely filled, liquid passes through conduit 122 into reservoir 101. When the liquid has entered reservoir 101 valve 121 is manipulated to close off completely fluid flow through conduits 124, 123 and 122. This entraps a measured volume of liquid in tank 100. Valve 113 is then opened to discharge the liquid in tank 100 through outlet conduit 112 while maintaining valve 121 in the second position. When the liquid has completely discharged from tank 100, valve 113 is closed and valve 121 is manipulated to permit fluid flow through inlet conduits 123, 122 and 124 to begin filling tank 100 and the cycle is then repeated.

Referring to FIGS. 1 through 4, inclusive, sensing element 108 is positioned in reservoir 101 for the purpose of indicating when the liquid in the reservoir has attained a predetermined level therein. Any type of sensing element capable of giving the desired indication may be employed. As will be described more fully hereinafter, sensing element 108 may be a float. If manual operation only is contemplated, sensing element 108 may be a sight glass.

Figure 5:
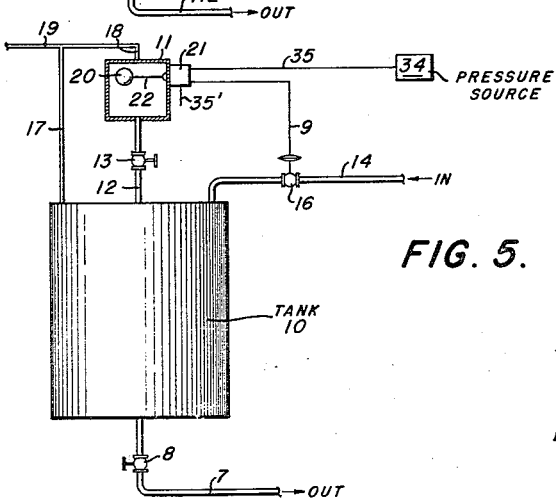
FIG. 5 is a diagrammatic view of a semiautomatic metering device according to the invention.

FIG. 5 illustrates one form of semiautomatic operation. A tank 10 is provided with an outlet conduit 7 in which is positioned a manually operable valve 8 to close off completely flow through conduit 7 when in a first position and to permit fluid flow through conduit 7 when in a second position. A reservoir 11 is positioned above tank 10. A conduit 12 fluidly communicates reservoir 11 and tank 10. A valve 13 is positioned in conduit 12 to permit and prevent fluid flow between tank 10 and reservoir 11. An inlet conduit 14 fluidly communicates with tank 10 and is provided with a diaphragm actuated valve 16 which permits flow into tank 10 in one position and prevents fluid flow into tank 10 in a second position. Valve 16 may be a conventional spring biased diaphragm type valve adapted to move to one position against the bias of the spring upon the application of fluid pressure to the diaphragm and to return to the original position under the bias of the spring upon bleeding or exhausting fluid pressure from the diaphragm. A suitable control mechanism is positioned in reservoir 11 and as shown constitutes a float 20 positioned on a pivotal rod 22 which in turn is connected to a control valve 21. Control valve 21 selectively connects conduit 9 with either conduit 35 or conduit 35'. Conduit 35 connects to a source of fluid pressure such as 34; conduit 35' is an exhaust and conduit 9 connects control valve 21 with the diaphragm of valve 16. The control valve 21 exhausts or bleeds conduit 9 through conduit 35' when the float 20 is in a down or low position and applies fluid pressure from fluid pressure source 34 and conduit 35 through conduit 9 to the diaphragm of valve 16 when the float 20 is in an up position. Valve 16 is normally open, that is this valve closes upon the application of fluid pressure through conduit 9.

In operation, assuming the tank has just discharged, valve 8 is manipulated to close off discharge from tank 10 through outlet 7. Valve 13 is then manipulated to drain fluid from chamber 11 to chamber 10 through conduit 12. Float 20 assumes the low position thereby causing valve 21 to connect conduits 9 and 35' to exhaust fluid pressure from the diaphragm of valve 16. This causes valve 16 to open thereby putting inlet conduit 14 in fluid communication with tank 10 and the tank begins to fill. When the tank has filled completely liquid enters reservoir 11 through conduit 12 and valve 13 thereby moving float 20 upwardly. Movement of float 20 upwardly actuates control valve 21 to fluidly communicate the source of fluid pressure 34 with the diaphragm of valve 16 through conduits 35 and 9 thereby closing off flow through conduit 14. Since the float is in an up position the pressure signal will be maintained in conduit 9 thereby maintaining valve 16 closed. When it is desired to discharge tank 10, valve 13 is manipulated to prevent fluid communication between tank 10 and reservoir 11 prior to opening of valve 8. Valve 8 is then opened and the tank is discharged through conduit 7 and the above described cycle of operation is repeated.

Pressure equalizing conduits or vents 117 in FIGS. 1 through 4 and vent 17 in FIG. 5 may be opened to atmosphere to permit gravity discharge from the meter, or these vents may be connected to any suitable pressure source to force liquid discharge.

Figure 6:
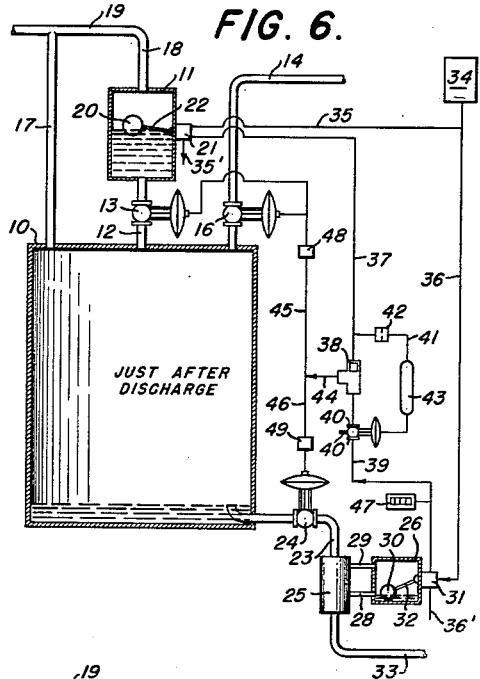
FIG. 6 is a diagrammatic view of a fully automatic metering device according to the invention showing the positions of the valves and controllers immediately after discharge of the tank.

Fully automatic operation will now be described. FIG. 6 shows a metering tank 10 on which is mounted a tank or chamber 11. The tanks 10 and 11 are connected by means of conduit 12 in which is positioned a valve 13 which can be opened and closed to control the movement of liquid through conduit 12. A fill conduit 14 connects into tank 10 from a source of liquid to be metered, such as production oil, not shown. A valve 16 is positioned in conduit 14 and is adapted to open and close to control the flow of liquid into tank 10.

Tank 10 may be provided with a vent or the pressure in tank 10 and chamber 11 may be equalized if desired. In FIG. 6 vent or pressure equalizing line 17 connects into the upper end of tank 10. Also, a vent or pressure equalizing line 18 connects into the upper end of tank or chamber 11. These conduits 17 and 18 are interconnected by means of conduit 19 to atmosphere or to any suitable pressure source.

A float 20 is positioned in tank 11 and connects to liquid livel control valve means 21 by means of pivotal rod 22.

A discharge conduit 23 is connected into the lower end of tank 10. A valve 24 is positioned in conduit 23 and is adapted to open and close to control the flow of liqiud therethrough. Conduit 23 connects into a chamber 25 to which is connected a liquid level control chamber 26 fluidly connected to chamber 25 by means of upper and lower conduits or passages 29 and 28, respectively. This control mechanism may be similar to that of chamber 11 and, accordingly, is provided with a float 30 connected to a suitable valve means 31 by means of pivotal rod 32. A conduit 33 connects into the lower end of chamber 25 for discharging liquid to storage or to any other desired place.

For fully automatic control of the metering device valves 13 and 16 are opened and valve 24 closed substantially simultaneously upon actuation of the liquid level control in chamber 26, and valves 13 and 16 are automatically closed and valve 24 opened substantially simultaneously upon a bleed signal controlled by the liquid level control in chamber 11. As seen in FIG. 6, a source of fluid pressure 34, which is a pilot control pressure, such as air under pressure, is connected to control valve means 21 through conduit 35. Also, valve means 31 is connected to the pilot control fluid pressure source 34 by means of a conduit 36. Valve 24 similar to valves 13 and 16, noted supra, may be a conventional spring biased diaphragm-type valve adapted to move to one position against the bias of the spring upon the application of fluid pressure to the diaphragm and to return to an original position under the bias of the spring upon bleeding fluid pressure from the diaphragm. Valve means 21 and 31 are adapted to bleed the pressure from conduits 37 and 39 through conduits 35' and 36', respectively, in one position and to transmit a pressure signal from conduits 35 and 36 to conduits 37 and 39, respectively, in another position, the positions being dependent upon movement of the floats 20 and 30. The pressure signal transmitted through conduit 35, valve means 21 and conduit 37 fluidly communicates with one side of a double check valve 38 connecting conduits 37 and 39 via conduit 39'. The pressure signal transmitted through conduit 36, valve means 31 and conduits 39 and 39' fluidly communicates with the opposite side of double check valve 38. A diaphragm valve 40 is positioned between conduits 39 and 39' for closing off and permitting fluid flow therethrough. Conduit 37 also connects into a conduit 41 which by-passes double check valve 38 and connects into the diaphragm of valve 40. An exhaust conduit 40' also connects into valve 40. This valve may be a conventional spring biased diaphragm valve whereby a pressure signal on the diaphragm closes off fluid communication between conduits 39 and 39' and fluidly communicates conduits 39' and 40' and exhaust or release of the pressure signal on the diaphragm fluidly communicates conduits 39 and 39'. Conduit 41 may be provided with an orifice 42 and a chamber 43 as shown. Double check valve 38 fluidly communicates with valves 13 and 16 by means of conduits 44 and 45 and fluidly communicates with valve 24 by means of conduits 44 and 46. Valves 13 and 16 are so constructed that the valve element in each is normally held in the closed position by the action of its biasing spring whereas valves 24 and 40 are so constructed that the valve element in each is normally held in the open position by the action of its biasing spring. A pressure operated mechanical counter 47 is shown connected into conduit 39 and is adapted to register upon the transmission of a pressure signal from valve 31 through conduit 39. This counter, as will be seen in the following description, registers upon each measured tank of liquid.

Figure 7:
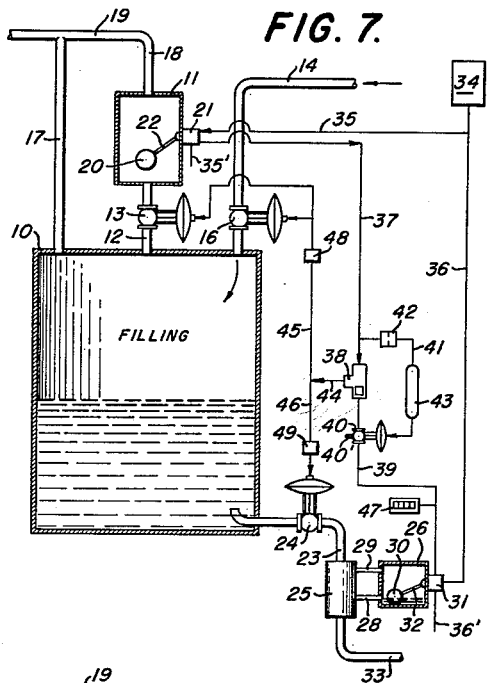
FIG. 7 is a view similar to FIG. 6 showing the control circuit and positions of the valves and controllers when the tank is filling.
Figure 8:
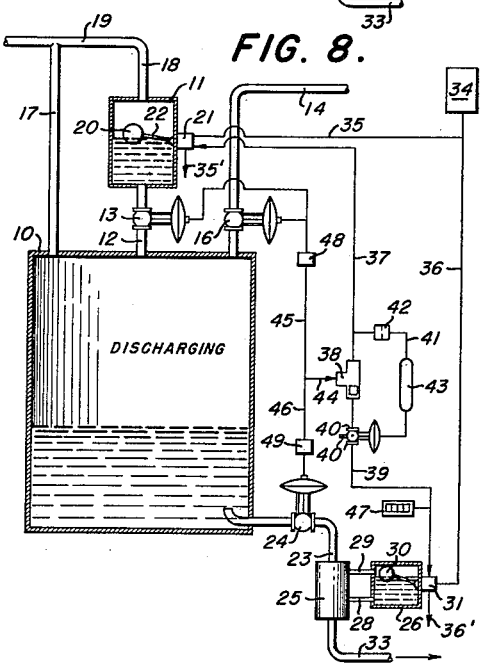
FIG. 8 is a view similar to FIG. 6 showing the control circuit and positions of the valves and controllers when the tank is discharging.

Valve 21 closes off the pilot signal pressure in conduit 35 and bleeds conduit 37 connecting into double check valve 38 and conduits 44, 45 and 46 connecting with valves 13, 16 and 24 when the float 20 is at a high level, as shown in FIGS. 6 and 8. When float 20 is at a low level, as shown in FIG. 7, a pressure signal is transmitted via conduit 35 through conduits 37, 44, 45 and 46 to the valves. Similarly, valve 31 closes off the pilot pressure to conduit 39 when the float 30 is at a high level as shown in FIG. 8 and bleeds pressure from conduit 39 through conduit 36'. When float 30 is at a low level a pressure signal is transmitted to conduit 39 from source 34.

FIG. 6 shows the positioning of the floats 20 and 30 just prior to opening of valves 13 and 16 and the closing of valve 24, that is, immediately after a measured tank of liquid has been discharged from tank 10.

Figure 9:
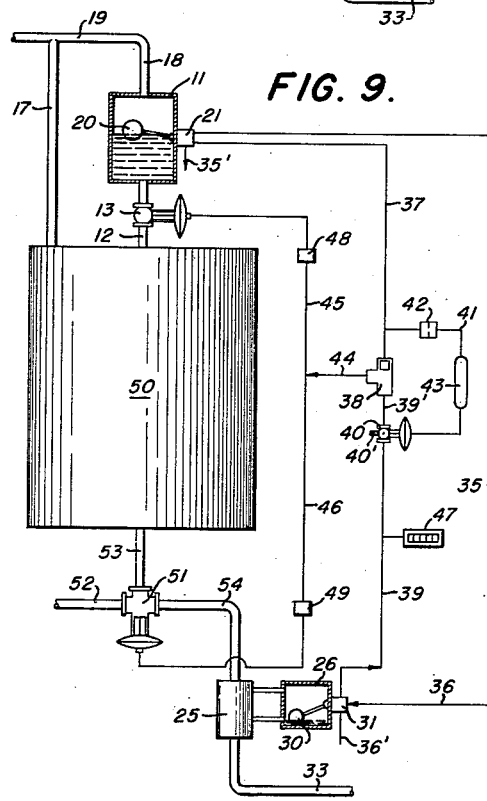
FIG. 9 is a modification showing a bottom drain-type metering device and illustrates fill and discharge conduits controlled by a 3-way valve.

FIG. 9 discloses a different embodiment of the invention. However, the basic operation is the same as that of FIG. 6. In this instance the discharge is of the bottom hole type drain whereby complete discharge of the tank 50 is obtained. Also, a 3-way valve 51 with a middle-off position connects with fill line 52, fill-discharge conduit 53 and discharge conduit 54. As readily seen, the 3-way type valve 51 may be employed instead of valves 16 and 24 of the embodiment of FIG. 6. Also, as illustrated in FIG. 4, a suitable 3-way valve may be substituted for valves 13 and 16 whereby the valve would permit fluid communication between fill conduit 14, conduit 12 and tank 10 in one position and close off fluid communication between fill conduit 14, conduit 12 and tank 10 in another position.

To insure that valves 13 and 16 close before valve 24 opens, as the discharge cycle begins, a speed control valve 49 may be positioned in conduit 46. Also, to insure that valve 24 closes before valves 13 and 16 open, as the filling cycle begins, a speed control valve 48 may be positioned in conduit 45. The operation of the speed control valves is as follows: Speed control valve 48 restricts flow going to the diaphragms of valves 13 and 16 but permits free flow from the diaphragms of valves 13 and 16. Contrariwise speed control valve 49 restricts fluid flow from the diaphragm of valve 24 but permits free flow of the pressure signal going to the diaphragm of valve 24. As readily seen, therefore, a pulse or pressure signal passing into conduits 45 and 46 from conduit 44 will actuate valve 24 immediately to close off flow through conduit 23 but the pulse or signal will be delayed to the diaphragms of valves 13 and 16 by speed control valve 48. Thus, valve 24 necessarily closes completely before valves 13 and 16 open thereby insuring that the measured volume of fluid will be only that contained in tank 10. Also, bleed or exhaust of pressure through conduits 44, and 46 is restricted by speed control valve 49 in conduit 46 and is not restricted through conduits 44 and 45 by speed control valve 48 in conduit 45 thereby insuring that valves 13 and 16 will close completely before valve 24 opens to discharge fluid from tank 10.

As shown in FIGS. 6 through 9 these speed control valves are adaptable for use with the modification of FIG. 9 and their operation is the same in conjunction with 3-way valve 51 of FIG. 9 as with the valve 24 of FIG. 6.

In operation, referring specifically to FIG. 6, liquid such as production oil enters tank 10 through conduit 14, valve 16 being open. During filling, valve 24 is closed and liquid rises in tank 10 until it then enters chamber 11 through conduit 12, valve 13 being open after tank 10 has filled. When chamber 11 has filled sufficiently to move float 20 to the up position, valves 13 and 16 are then closed thereby providing a completely full, measured tank of liquid. Valve 24 is then opened and the volume of liquid in tank 10 is discharged through conduit 23. While fluid is being discharged from tank 10, float 30 is in the position shown in FIG. 8 due to the flooding of chamber 11 in the filling cycle. When tank 10 has been fully discharged, float 30 is in the position shown in FIGS. 6 or 7 and valve 24 is closed and valves 16 and 13 opened and the cycle is repeated thereby obtaining a consistent full tank volume of liquid in each cycle.

As shown in FIGS. 6, 7 and 8, for fully automatic operation, a pilot control pressure signal is transmitted through conduits 35 and 36 to liquid level control valve means 21 and 31, respectively. Assuming that the liquid in tank 10 has just discharged through conduit 23, chamber 26 and discharge conduit 33, float 30 drops to a low level position shown in FIG. 6 thereby transmitting a pressure signal through conduit 39, valve 40 (now open) and into double check valve 38. The signal is then transmitted through conduit 44 to conduits 45 and 46 and thence to the diaphragms of valves 13, 16 and 24, respectively. This opens normally closed valves 13 and 16 and closes normally open valve 24. Opening of valve 13 releases the liquid contained in chamber 11 permitting this liquid to flow into tank 10, which liquid will be measured and discharged from tank 10 when valve 24 again opens. The flow of liquid from chamber 11 causes float 20 to drop to a low level as seen in FIG. 7 thereby actuating valve means 21 which transmits a pressure signal from conduit 35 into conduit 37. The signal pressure in conduit 37 is applied to double check valve 38 to reverse the action of check valve 38 and supply a pressure signal to conduits 44, 45 and 46 and thence to the diaphragms of valves 13, 16 and 24 to maintain these valves in the positions initiated by the pressure signal transmitted through conduit 39. Simultaneously therewith a signal is transmitted through conduit 41 to normally open diaphragm valve 40 which cuts off the fluid pressure signal being applied to check valve 38 through conduit 39 and bleeds that side of valve 38 to atmosphere through valve 40. Fill conduit 14 conveys liquid to valve 16 (now open) to fill tank 10. The liquid rises until tank 10 is full and then the liquid enters chamber 11 through conduit 12 and open valve 13. The float 20 then rises to a high level, as shown in FIGS. 6 and 8, by the rise of liquid in chamber 11. The rise of float 20 actuates valve means 21 to bleed conduit 37 through bleed line 35′ which in turn bleeds conduits 44, 45 and 46 fluidly communicating with valves 13, 16 and 24, respectively. This causes actuation of valves 13, 16 and 24 to close valves 13 and 16 and to open valve 24 as indicated in FIG. 8. The liquid in tank 10 then discharges through open valve 24, conduit 23, passage 29, chamber 26, passage 28 and discharge conduit 33. The flow of fluid through these elements raises the float 30 in chamber 26, as shown in FIG. 8, thereby actuating valve means 31 to bleed the pressure in conduit 39. The bleeding of conduit 39 is necessary since conduit 39 has fluid communication with valves 13, 16 and 24 through valve 40, which latter valve opened upon bleeding of conduit 37 and now is ready to receive the reverse signal as tank 10 is emptied. Delay timing means may be provided by orifice 42 and chamber 43 to insure that valve 40 does not open until valve means 31 is actuated to exhaust conduit 39. Thus, a cycle of operation has been completed. When the liquid has discharged from chamber 26, the float 30 drops to the low level pressure signal position, as shown in FIG. 7 and the above recited cycle of operation is repeated.

FIG. 9 shows an embodiment of the present invention having a bottom drain-type fluid meter. The operation of the automatic control system is identical to that described supra with reference to FIGS. 6 through 8. However, in the modification of FIG. 9, the inlet and discharge conduits 52, 53 and 54 are controlled by means of a 3-way valve. In this case the signal transmitted through conduits 44, 46 moves the 3-way valve to fluidly communicate conduits 52 and 53 to the tank filling position and closes off conduit 54; bleeding of the signal in conduit 46 causes the 3-way valve to fluidly communicate conduits 53 and 54 and to close off conduit 52.

This device is adaptable for use with many types of control systems other than the semi-automatic, fully automatic and manual operations described supra. For example, a semi-automatic operation may be employed whereby only the upper liquid level controller in tank 11 is utilized to close off valves 13 and 16 and to open valve 24. To insure a consistent measurable tank volume the valves 13 and 16 and valve 24 may then be manually opened and closed, respectively.

The description of the invention has shown and described only a few types of control mechanisms. The demands in any particular installation and the different possible combinations employable therewith will be obvious for industrial users and are to be considered within the scope of this invention. The described method and apparatus for obtaining accurate tank measurements are adaptable to any manner of control from simple manual operation to self-actuating, fully automtic, remote control operation. It is possible to adapt this automatic control system to two or more tanks whereby one or more of the tanks are being filled while one or more of the other tanks are being discharged. This may be accomplished merely by adjusting the controls described and contemplated by this invention.

Although oil production operations were specified in describing the operation of this invention, other liquids or mixtures of liquid and solids may be measured similarly so long as the mixture retains liquid characteristics. Accordingly, the term "liquid" as used herein may include gases mixed with or dissolved in the liquid metered and may include liquids containing suspended solids.

Whenever the term "empty" is used in this specification or the appended claims with reference to the lower tank of the present device, it shall mean either that the tank is completely devoid of liquid or that the liquid level in the tank has reached a predetermined low level as indicated in FIG. 6.

Various valves and control devices were described herein. These elements are conventional and form no part of the present invention.

Having fully described the nature, objects, operation and structure of my invention, I claim:

1. A metering device comprising a liquid metering tank provided with valve means for controlling flow of fluid to and from said tank; a chamber arranged above said tank; a valve positioned between said chamber and said tank adapted to open and close to permit and prevent fluid flow therebetween; first control means connected to said chamber operatively responsive to higher and lower liquid levels in said chamber; second control means operatively responsive to discharge and non-discharge of liquid from said tank; actuating means operatively responsive to the operation of said first and second control means adapted to operate said valve and said valve means; said second control means in response to non-discharge of liquid from said tank and said first control means in response to a higher liquid level in said chamber cooperating to control said actuating means to open said valve to permit liquid in said chamber to discharge into said tank and to actuate said valve means to prevent discharge of liquid from said tank and to admit liquid to said tank; said first control means in response to a lower liquid level in said chamber caused by discharge of liquid from said chamber to said tank and said second control means in response to non-discharge of liquid from said tank cooperating to control said actuating means to maintain said valve open and said valve means in position to admit liquid to said tank and prevent discharge of liquid from said tank; said first control means in response to a higher liquid level in said chamber caused by liquid filling said tank, flooding said valve and entering said chamber, and said second control means in response to non-discharge of liquid from said tank cooperating to control said actuating means to close said valve and actuate said valve means to prevent admission of liquid to said tank and to permit discharge of liquid from said tank; and said second control means in response to discharge of liquid from said tank and said first control means in response to a higher liquid level in said chamber cooperating to control said actuating means to maintain said valve closed and said valve means in position to prevent admission of liquid to said tank and to permit discharge of liquid from said tank.

2. Apparatus as recited in claim 1 wherein said actuating means includes signal transmission means.

3. Apparatus as recited in claim 1 wherein said actuating means includes fluid pressure signal transmission means; and said valve means and said valve are fluid pressure actuated.

4. Apparatus as recited in claim 3 wherein said signal transmission means includes means for delaying opening of said valve and actuation of said valve means to admit liquid to said tank until said valve means actuates to prevent discharge of liquid from said tank; and means for delaying actuation of said valve means to discharge liquid from said tank until said valve closes and said valve means actuates to prevent admission of liquid to said tank.

5. A metering device comprising a liquid metering tank provided with first valve means for controlling flow of fluid from said tank; a chamber arranged above said tank; second valve means positioned between said chamber and said tank adapted to open and close to permit and prevent fluid flow therebetween; third valve means for controlling flow of inlet fluid to said tank; first control means connected to said chamber operatively responsive to higher and lower liquid levels in said chamber; second control means operatively responsive to discharge and non-discharge of liquid from said tank; actuating means operatively responsive to the operation of said first and second control means adapted to actuate said first, second, and third valve means; said second control means in response to non-discharge of liquid from said tank and said first control means in response to a higher liquid level in said chamber cooperating to control said actuating means to open said second valve means to permit liquid in said chamber to discharge into said tank, to open said third valve means to admit liquid to said tank and to close said first valve means to prevent discharge of liquid from said tank; said first control means in response to a lower liquid level in said chamber caused by discharge of liquid from said chamber to said tank and said second control means in response to non-discharge of liquid from said tank cooperating to control said actuating means to maintain said second valve means open, said third valve means open, and said first valve means closed; said first control means in response to a higher liquid level in said chamber caused by liquid filling said tank, flooding said valve, and entering said chamber and said second control means in response to non-discharge of liquid from said tank cooperating to control said actuating means to close said second valve means, close said third valve means, and open said first valve means; and said second control means in response to discharge of liquid from said tank and said first control means in response to a higher liquid level in said chamber cooperating to control said actuating means to maintain said second valve means closed, said third valve means closed, and said first valve means open.

6. Apparatus as recited in claim 5 wherein said actuating means includes signal transmission means.

7. Apparatus as recited in claim 5 wherein said actuating means includes fluid pressure signal transmission means and said first, second, and third valve means are fluid pressure actuated.

8. A metering device comprising a liquid metering tank; a chamber arranged above said tank; valve means adapted to open and close to permit and prevent fluid flow between said tank and said chamber and to control flow of fluid to and from said tank; first control means connected to said chamber operatively responsive to higher and lower liquid levels in said chamber; second control means operatively responsive to discharge and non-discharge of liquid from said tank; actuating means operatively responsive to the operation of said first and second control means adapted to operate said valve means; said second control means in response to non-discharge of liquid from said tank and said first control means in response to a higher liquid level in said chamber cooperating to control said actuating means to actuate said valve means to permit fluid communication between said chamber and said tank and to admit liquid to said tank and prevent discharge of liquid from said tank; said first control means in response to a lower liquid level in said chamber caused by discharge of liquid from said chamber to said tank and said second control means in response to non-discharge of liquid from said tank cooperating to control said actuating means to maintain said valve means in position to maintain fluid communication between said chamber and said tank and to admit liquid to said tank and prevent discharge of liquid from said tank; said first control means in response to a higher liquid level in said chamber caused by liquid filling said tank and entering said chamber and said second control means in response to non-discharge of liquid from said tank cooperating to control said actuating means to actuate said valve means to prevent fluid communication between said chamber and said tank and to prevent admission of liquid to said tank and permit discharge of liquid from said tank; and said second control means in response to discharge of liquid from said tank and said first control means in response to a higher liquid level in said chamber cooperating to control said actuating means to maintain said valve means in position to prevent fluid communication between said chamber and said tank and to prevent admission of liquid to said tank and permit discharge of liquid from said tank.

9. Apparatus as recited in claim 8 wherein said actuating means includes signal transmission means.

10. Apparatus as recited in claim 8 wherein said actuating means includes fluid pressure signal transmission means; and said valve means are fluid pressure actuated.

11. Apparatus as recited in claim 10 wherein said signal transmission means includes means for delaying actuation of said valve means to fluidly communicate said chamber and said tank and admit liquid to said tank until said valve means actuates to prevent discharge of liquid from said tank; and means for delaying actuation of said valve means to discharge liquid from said tank until said valve means actuates to prevent fluid communication between said chamber and said tank and prevent admission of liquid to said tank.

References Cited in the file of this patent

UNITED STATES PATENTS

| | | |
|---|---|---|
| 400,251 | Reed | Mar. 26, 1889 |
| 1,062,937 | Wallen | May 27, 1913 |
| 1,683,337 | Ernest et al. | Sept. 4, 1928 |
| 1,786,302 | Herbst et al. | Dec. 23, 1930 |
| 2,158,381 | Raymond | May 16, 1939 |
| 2,396,527 | Osborne | Mar. 12, 1946 |
| 2,471,778 | Ringer | May 31, 1949 |
| 2,717,516 | Swift et al. | Sept. 13, 1955 |
| 2,831,350 | Banks et al. | Apr. 22, 1958 |

FOREIGN PATENTS

| | | |
|---|---|---|
| 13,551 | Netherlands | Oct. 15, 1925 |
| 947,663 | France | Jan. 17, 1949 |